(12) United States Patent  
Hong et al.

(10) Patent No.: US 10,358,015 B2
(45) Date of Patent: Jul. 23, 2019

(54) AIR-CONDITIONING SYSTEM FOR A MACHINE

(71) Applicant: Caterpillar Inc., Peoria, IL (US)

(72) Inventors: Haiping Hong, Peoria, IL (US); Kory K. Leesman, Hartsburg, IL (US); Ravichandran Arvindvivek, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 475 days.

(21) Appl. No.: 15/070,125

(22) Filed: Mar. 15, 2016

(65) Prior Publication Data

US 2017/0267066 A1  Sep. 21, 2017

(51) Int. Cl.
*B60H 1/32* (2006.01)
*B60H 1/00* (2006.01)

(52) U.S. Cl.
CPC ........ *B60H 1/3205* (2013.01); *B60H 1/005* (2013.01); *B60H 1/322* (2013.01); *B60H 2001/3266* (2013.01)

(58) Field of Classification Search
CPC .......... B60H 1/3205; B60H 1/00271; B60H 2001/00307; B60H 1/322; B60H 1/005; B60H 2001/3266; F25B 1/00; F25B 13/00; F25B 30/02; F25B 39/00
See application file for complete search history.

(56) References Cited

U.S. PATENT DOCUMENTS

| | | | | |
|---|---|---|---|---|
| 6,053,006 A | * | 4/2000 | Kimborn | F25D 16/00 62/434 |
| 6,260,376 B1 | * | 7/2001 | Khelifa | F25D 16/00 62/430 |
| 7,707,845 B2 | * | 5/2010 | Bilodeau | B60H 1/00378 165/42 |
| 2004/0060310 A1 | * | 4/2004 | Liu | B60H 1/00792 62/228.3 |
| 2005/0022983 A1 | * | 2/2005 | Kadle | B60H 1/00878 165/202 |
| 2005/0178537 A1 | | 8/2005 | Horn et al. | |
| 2006/0137853 A1 | | 6/2006 | Haller et al. | |
| 2008/0173029 A1 | * | 7/2008 | Kraemer | B60H 1/005 62/89 |
| 2009/0314023 A1 | | 12/2009 | Labaste Mauhe et al. | |
| 2012/0090823 A1 | * | 4/2012 | Labaste Mauhe | B60H 1/00328 165/173 |

(Continued)

FOREIGN PATENT DOCUMENTS

DE 10337889 12/2004
FR 2764548 12/1998

*Primary Examiner* — Emmanuel E Duke (57) ABSTRACT

An air-conditioning system including a primary circuit and a secondary circuit is provided. The primary circuit includes a flow of refrigerant, an evaporator and a chiller configured to exchange heat between a coolant and the refrigerant. The secondary circuit includes a heat exchanger in fluid communication with the chiller to receive the coolant. The heat exchanger includes a phase change material in heat exchange relationship with the coolant, such that the coolant exchanges heat with the phase change material to store thermal energy in the phase change material. The air-conditioning system is implemented in a machine in which during an idle-off state, the stored energy in the heat exchanger is discharged to provide an air-conditioning effect.

20 Claims, 9 Drawing Sheets

(56) References Cited

U.S. PATENT DOCUMENTS

2013/0074533 A1* 3/2013 Yagi .................. B60H 1/00492
  62/129
2015/0292775 A1* 10/2015 Ma ....................... F25B 25/005
  62/115
2017/0087957 A1* 3/2017 Blatchley .......... B60H 1/00278

* cited by examiner

AIR-CONDITIONING SYSTEM FOR A MACHINE

TECHNICAL FIELD

The present disclosure relates generally to an air-conditioning system for a machine, and more particularly, to an air-conditioning system responsive to an operating condition of the machine.

BACKGROUND

Most mobile machines, such as an off-highway truck, include an operator cabin having a controlled environment that provides operator comfort. The machine generally includes an air-conditioning system to maintain the operator cabin at a desired temperature. These mobile machines are often required to work in 'idle state' for long periods of time during which the machine's engine is being used to power the air-conditioning system. For example, an off-highway truck may idle when a body of the truck is being loaded which often takes considerable amount of time. In some locations, however, idling for long periods of time may not be allowed for environmental reasons. And even if long periods of idling are allowed, doing so can be inefficient and costly. In these situations, the engine of the machine needs to be turned off, which in turn switches off the air-conditioning system and resulting in ambient conditions within the operator cabin that may be uncomfortable for the operator.

US Patent Publication No. 20120090823 (hereinafter referred to as '823 publication) relates to a storage heat exchanger with interstitial space filled with a material for storing calories. The '823 publication provides a main air-conditioning loop and a secondary loop arranged in a heat exchange relationship with the main air-conditioning loop. The secondary loop includes the storage heat exchanger, a pump for circulating fluid through the secondary loop, and a heat exchanger. An evaporator, in the main air-conditioning loop, provides the air-conditioning effect. The evaporator further allows the transfer of heat between refrigerant fluid circulating inside the main air-conditioning loop and the secondary heat transfer fluid circulating inside the secondary loop. Therefrom, the secondary heat transfer fluid transfers heat with the said material of the storage heat exchanger for providing air-conditioning effect when the main air-conditioning loop is stopped.

In the '823 publication, the use of same evaporator for air-conditioning as well as exchanging heat with the secondary heat transfer fluid limits the temperature control and heat transfer rate to the secondary heat transfer fluid. Further, the disclosed storage heat exchanger has a potential energy between 200 and 270 kJ. The size of the storage heat exchanger along with other physical features limits the heat transfer rate between the secondary heat transfer fluid and storage material. Thus, the disclosed system may primarily be applicable for air-conditioning of relatively small automotive vehicles using the storage heat exchanger, and may not be easily scalable to provide air-conditioning for large machines or the like.

SUMMARY OF THE DISCLOSURE

In one aspect of the present disclosure, an air-conditioning system including a primary circuit and a secondary circuit is described. The primary circuit has a refrigerant flowing therein. The primary circuit includes a compressor configured to compress and circulate the refrigerant. The primary circuit also includes a condenser configured to exchange heat between the refrigerant and air in outside environment. The primary circuit also includes an evaporator configured to exchange heat between the refrigerant and air in an operator cabin. The primary circuit further includes a chiller configured to exchange heat between the refrigerant and a coolant. The secondary circuit has the coolant flowing therein. The secondary circuit includes a heat exchanger, having a phase change material, in fluid communication with the chiller to receive the coolant. The heat exchanger is configured to exchange heat between the phase change material and the coolant and store energy in the phase change material. The secondary circuit further includes a coolant-to-air heat exchanger in fluid communication with the heat exchanger to receive the coolant. The coolant-to-air heat exchanger is configured to exchange heat between the coolant and air in the operator cabin.

In another aspect of the present disclosure, a method of operating the air-conditioning system is described. The method includes determining whether a machine is in an 'operation state' or an 'idle off state'. The method further includes selectively activating the primary circuit during the 'operation state' of the machine by initiating a flow of refrigerant in the primary circuit to exchange heat between air in the operator cabin and the refrigerant, via the evaporator. The method further includes circulating the refrigerant to the chiller of the primary circuit. The method further includes initiating the flow of coolant through the chiller to exchange heat between the coolant and the refrigerant. The method further includes circulating the coolant from the chiller to the heat exchanger to exchange heat between the coolant and the phase change material, and store thermal energy in the phase change material. The method further includes selectively activating the secondary circuit during the 'idle off state' of the machine by circulating the coolant through the heat exchanger to exchange heat between the phase change material and the coolant, to the coolant-to-air heat exchanger, wherein the coolant exchanges heat with air in the operator cabin, via the coolant-to-air heat exchanger.

In yet another aspect of the present disclosure, the air-conditioning system for the machine having an operator cabin is described. The air-conditioning system includes the primary circuit and the secondary circuit. The primary circuit has the refrigerant flowing therein. The primary circuit includes the compressor configured to compress and circulate the refrigerant. The primary circuit also includes the condenser configured to exchange heat between the refrigerant and air in outside environment. The primary circuit also includes the evaporator configured to exchange heat between the refrigerant and air in the operator cabin. The primary circuit further includes the chiller configured to exchange heat between the refrigerant and the coolant. The secondary circuit has the coolant flowing therein. The secondary circuit includes the heat exchanger, having the phase change material, in fluid communication with the chiller to receive the coolant. The heat exchanger is configured to exchange heat between the phase change material and the coolant and store energy in the phase change material. The secondary circuit further includes the coolant-to-air heat exchanger in fluid communication with the heat exchanger to receive the coolant. The coolant-to-air heat exchanger is configured to exchange heat between the coolant and air in the operator cabin. The air-conditioning system further includes a controller in communication with the primary circuit and the secondary circuit. The controller is configured to determine whether the machine is in the 'operation 'state' or the 'idle off state'. The controller is further configured to selectively activate the primary circuit during the 'operation state' of the machine. The controller is further configured to selectively activate the secondary circuit during the 'idle off state' of the machine.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
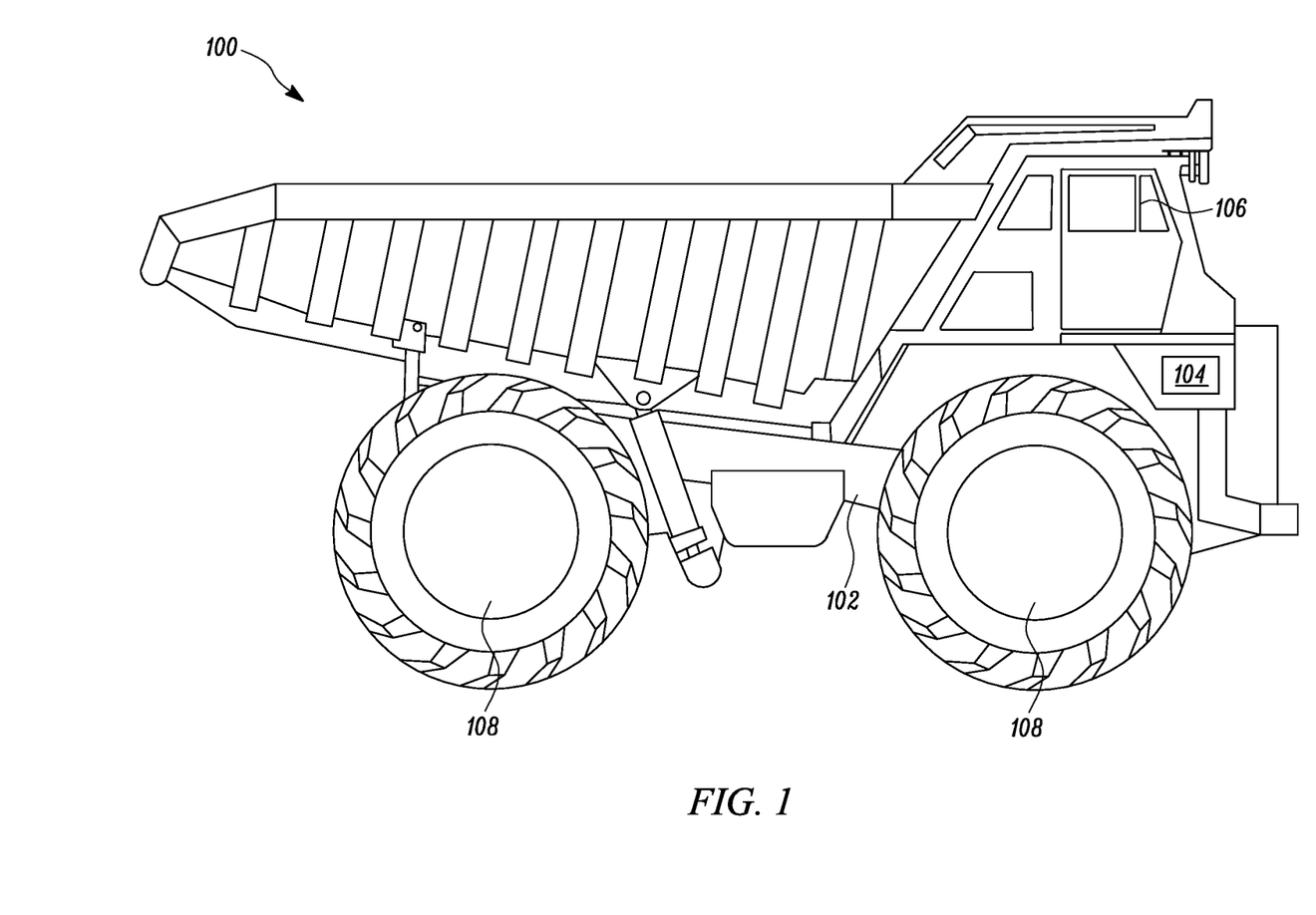
FIG. 1 is a planar illustration of an exemplary machine, according to an embodiment of the present disclosure.

FIG. 1 illustrates an exemplary machine 100 in which embodiments of the present disclosure may be implemented. The machine 100 may be a mobile machine that performs some type of operation associated with an industry such as mining, construction, farming, or any other industry known in the art. For example, the machine 100 may be a haul truck, such as, an off-highway truck, as shown in FIG. 1. Alternatively, the machine 100 may be an earth-moving machine, such as, a track-type tractor, a wheel loader, or another type of mobile machine. The machine 100, in one example, may include a frame 102 that supports an engine (representatively shown in FIG. 1 and referenced by numeral 104). It may be understood that the location of the engine 104, as shown in the drawings, is exemplary only. The machine 100 may further include an operator cabin, hereinafter simply referred to as cabin 106, supported on the frame 102. The machine 100 may also include one or more traction devices 108 that are rotatably connected to the frame 102 and driven by the engine 104 to propel the machine 100.

The cabin 106 may be an onboard location from where an operator observes performance of the machine 100 and provides instructions for controlling the machine 100. In the illustrated example, the cabin 106 is a substantially enclosed structure supported by the frame 102 that includes one or more interface devices (not shown) located proximate to an operator seat (not shown). In one example, the cabin 106 may be provided with insulating layers (not shown) on the inside to minimize the heat exchange with the ambient environment. In an embodiment, the machine 100 may be equipped with an air-conditioning system 200, as diagrammatically illustrated in FIG. 2. The air-conditioning system 200 provides operator comfort within the cabin 106. In some examples, the air-conditioning system 200 may be a stand-alone system powered directly or indirectly by the engine 104 and/or any other energy source, such as a battery or hydraulic power, in the machine 100.

Figure 3:
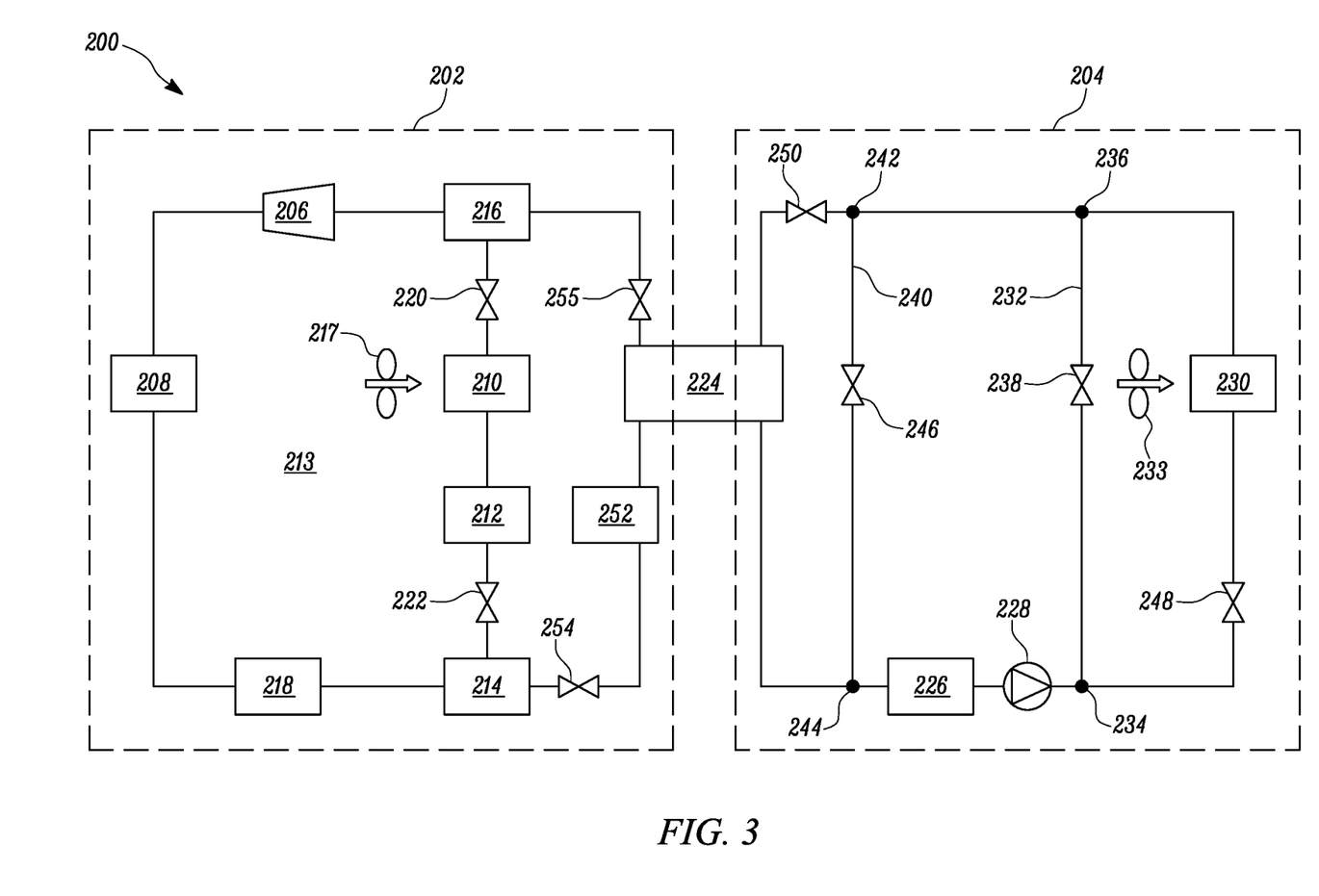
FIG. 3 is a schematic illustration of the air-conditioning system, according to an embodiment of the present disclosure.

FIG. 3 illustrates a detailed schematic of the air-conditioning system 200, according to an embodiment of the present disclosure. As illustrated, the air-conditioning system 200 may include a primary circuit 202 and a secondary circuit 204. FIG. 3 also shows the connection between the primary circuit 202 and the secondary circuit 204. It may be contemplated that the relative position of the components of the air-conditioning system 200 are exemplary and may be varied as long as the components achieve the intended functions in the air-conditioning system 200. The lines, as illustrated in FIG. 3, represent pipes, tubes or channels which facilitate the flow of various fluids in the air-conditioning system 200. All the joints connecting the various components to each other or the lines may be leak proof to prevent leakage of the fluid from the air-conditioning system 200. Further, various components as illustrated may be joined or integrated into single units as per the space constrains in the machine 100 and/or for saving the cost of the material used.

The primary circuit 202 may be based on a vapor-compression refrigeration cycle, and may include, among other things, a compressor 206, a condenser 208, an evaporator 210 and a first throttling device 212, arranged in a main loop 213. The compressor 206 may be mechanical and driven by the engine 104 of the machine 100. The primary circuit 202 may include a refrigerant flowing in the main loop 213. The refrigerant may be, for example, R-134a, R-152a, ammonia, carbon dioxide, and or any refrigerant that has phase change properties within the appropriate temperature range for the purpose of the present disclosure. Further, the primary circuit 202 may include a first manifold 214 and a second manifold 216 disposed upstream of the first throttling device 212 and downstream of the evaporator 210, respectively. It may be contemplated that the first manifold 214 and the second manifold 216 may be in the form of a junction for providing connection for the flow of refrigerant from the main loop 213 to other loops/circuits of the air-conditioning system 200.

The evaporator 210, in the primary circuit 202, may be disposed in the cabin 106 of the machine 100. The evaporator 210 functions as a heat exchanger to exchange heat, typically absorb heat (i.e., cool or condition), from a fluid such as air in the cabin 106, and thus regulate the temperature inside the cabin 106. The air in the cabin 106 flows across the evaporator 210 for exchange of heat with the refrigerant in the evaporator 210. It may be contemplated that the air flow may be generated by a fan or any other means known in the art. For example, the evaporator 210 may be provided with a first fan 217 which introduces a blended amount of fresh and recirculation air flow through the evaporator 210 and into the cabin 106.

The compressor 206, in the primary circuit 202, pressurizes the refrigerant in its gaseous state, to circulate it throughout the primary circuit 202, and in turn also heats the refrigerant. The hot pressurized gaseous refrigerant exiting from the compressor 206 flows through the condenser 208, which functions as a heat exchanger to transfer heat from the refrigerant to the air in the outside environment, such as to air circulation blown by a fan (not shown) across the condenser 208. The hot refrigerant gas may condense in the condenser 208 to a pressurized moderate temperature liquid. The liquid refrigerant exiting from the condenser 208 flows to the first manifold 214 and further to the first throttling device 212, where the temperature of the refrigerant is reduced. The cooled refrigerant exiting from the first throttling device 212 flows into the evaporator 210, where the refrigerant evaporates and absorbs heat from air in the cabin 106, producing the air-conditioning effect. The refrigerant from the evaporator 210 flows through the second manifold 216 and back to the compressor 206, thus completing the cycle through the main loop 213.

In one example, the primary circuit 202 may optionally include a drier 218 disposed downstream of the condenser 208 to remove any moisture or water particles from the refrigerant. Also, the primary circuit 202 may include an evaporator pressure regulating valve 220 disposed between the evaporator 210 and the second manifold 216. The evaporator pressure regulating valve 220 may reduce the pressure of the refrigerant flowing from the evaporator 210 to the second manifold 216. Further, the primary circuit 202 may include a shut-off valve 222 disposed, in an example, between the first manifold 214 and the first throttling device 212. In an embodiment of the present disclosure, the primary circuit 202 also includes a chiller 224. The details about functions and connections of the chiller 224 with other components of the air-conditioning system 200 will be described in the subsequent paragraphs.

FIG. 3 also illustrates a detailed schematic of the secondary circuit 204 having a coolant flowing therein. In one example, the coolant may be a mixture of water and glycol. The secondary circuit 204 may include, among other components, a heat exchanger 226, a pump 228 and a coolant-to-air heat exchanger 230. Further, it may be seen that the chiller 224, of the primary circuit 202, may also be disposed in fluid communication with the secondary circuit 204. In an embodiment of the present disclosure, the chiller 224 may be a plate type heat exchanger having at least two channels to allow heat exchange between two fluids flowing in the two channels. Specifically, the chiller 224 may be designed to optimize the heat exchange between the refrigerant flow from the primary circuit 202 and the coolant from the secondary circuit 204.

In one example, the pump 228 may be any one of a rotary or reciprocating electric pump to enable a flow of coolant in the secondary circuit 204. The electric pump 228 may be driven by a battery (not shown) when the engine 104 is off and by an alternator (not shown) when the engine 104 is running. Further, similar to the evaporator 210, the coolant-to-air heat exchanger 230 may be disposed in the cabin 106 of the machine 100. The coolant-to-air heat exchanger 230 functions as a heat exchanger to absorb heat (i.e., cool or condition) from a fluid such as air in the cabin 106 to be air-conditioned. The air flow in the cabin 106 flows across the coolant-to-air heat exchanger 230 for exchange of heat with the coolant in the coolant-to-air heat exchanger 230. The air flow may be generated by a fan or any other means known in the art. For example, the coolant-to-air heat exchanger 230 may be provided with a second fan, diagrammatically represented by the numeral 233, which introduces a blended amount of fresh and recirculation air flow into the cabin 106. In some examples, the evaporator 210 and the coolant-to-air heat exchanger 230 may share the fan 217, and formed be in a single case common to both the primary circuit 202 and the secondary circuit 204.

Figure 5:
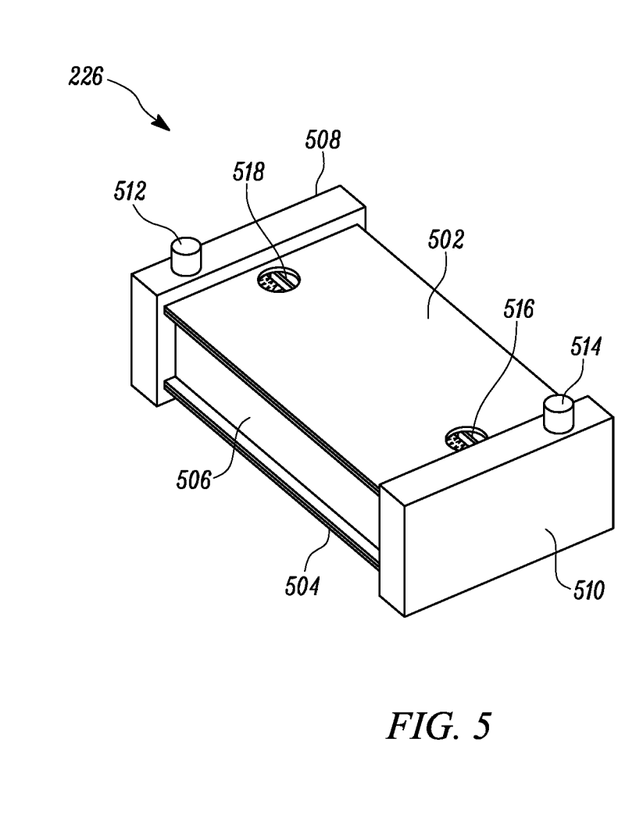
FIG. 5 is a perspective view of a heat exchanger, according to an embodiment of the present disclosure.

FIG. 5 illustrates an exemplary embodiment of the heat exchanger 226. In an embodiment, the heat exchanger 226 is a phase change material (PCM) heat exchanger. The terms "phase change material" and its acronym "PCM" have been interchangeably used hereinafter. The heat exchanger 226 may store thermal energy in the form of latent heat of fusion and sensible heat using the phase change material. The phase change material may be selected from the group including, hydrated salts, organic or alcohol based compounds, eutectic solutions and/or admixtures thereof. In one example, the preferred freezing temperature for the phase change material is in the range of 4 to 6° C. In one example, the phase change material is paraffin wax.

Figure 6:
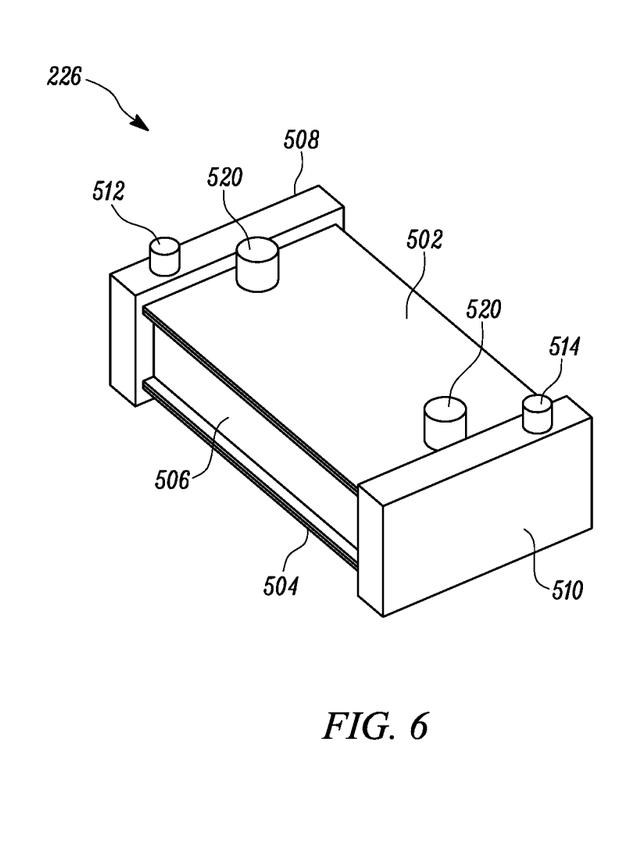
FIG. 6 is a perspective view of the heat exchanger with caps, according to an embodiment of the present disclosure.

The heat exchanger 226 may be made from aluminum and have a rectangular-box shaped design with four cover plates, a top cover plate 502, a bottom cover plate 504, a first side cover plate 506 and a second side cover plate (not shown). The heat exchanger 226 may include an inlet header 508 and an outlet header 510 forming the other two sides thereof. The inlet header 508 is provided with an inlet port 512 and the outlet header 510 is provided with an outlet port 514 which allows for the flow of coolant to inside and outside of the heat exchanger 226, respectively. Further, the top cover plate 502 may be provided with an air venting port 516 and one or more PCM filling ports 518. The heat exchanger 226 may also include caps 520 for the air venting port 516 and the PCM filling port 518, as shown in FIG. 6. The caps 520 prevent the leakage and oxidation of the PCM from interior of the heat exchanger 226, via the ports 516, 518. In addition, the heat exchanger 226 may be wrapped with some thermal insulation material (not shown) around all of its outside surfaces.

Figure 7:
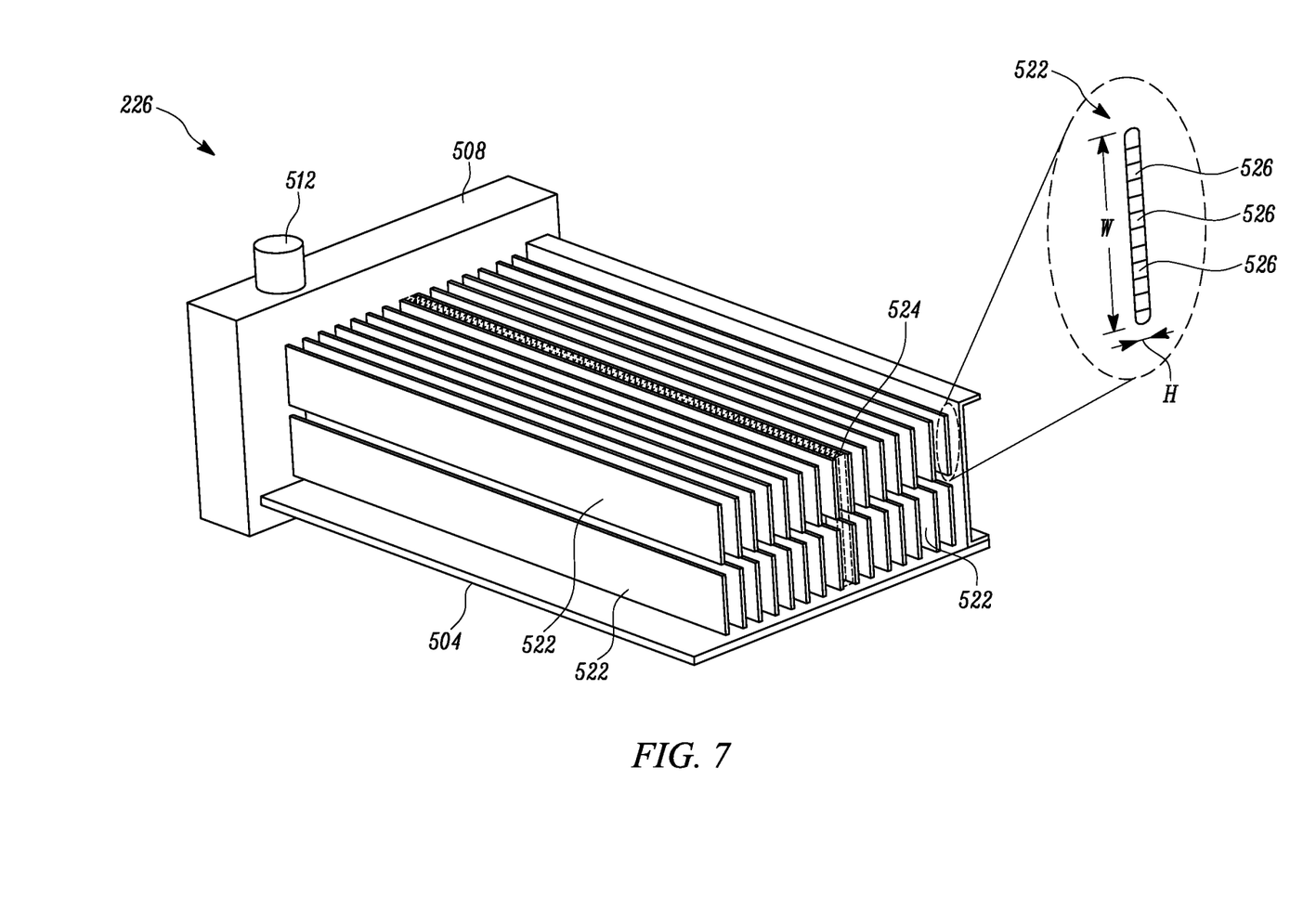
FIG. 7 is a perspective view of the heat exchanger illustrating tubes and fins, according to an embodiment of the present disclosure.

FIG. 7 illustrates an interior of the heat exchanger 226 with the top cover plate 502, the first side cover plate 506 and the outlet header 510 removed. In an embodiment, the interior of the heat exchanger 226 has a tube-fin structure, i.e., includes multiple rows of tubes 522 and fins 524. The phase change material may be filled or encapsulated in the space between the tubes 522 and the fins 524. The tubes 522 may be connected to the inlet header 508 at one end and the outlet header 510 at other end, by soldering, brazing, or some other joining process. In an embodiment, the heat exchanger 226 may include two or more rows of the tubes 522. In one example, the numbers of rows of the tubes 522 are in the range of 2 to 10. In the illustrated example, the heat exchanger 226 is shown to include two rows of the tubes 522, one above the other. Also it may be contemplated that although only one column of fins 524 is shown in FIG. 7, the heat exchanger 226 may include multiple fins 524 disposed between multiple columns of tubes 522. In other examples, the numbers of rows of the fins 524 may correspond to the numbers of rows of the tubes 522.

FIG. 7 also illustrates a zoomed view of the tube 522, in cross-section. The tubes 522 may be of multi-port, micro-channel or multi-channel design. In FIG. 7, the tube 522 is shown as a multi-channel type, where each tube 522 may include two or more channels 526. In the illustrated example, the tube 522 is shown to include a plurality of channels 526. The tube 522 may have a height 'H' of about 1 to 2 millimeters and a width 'W' ranging from 20 to 120 millimeters, depending on the number of channels 526 among other factors. Further each of the channels 526 may have a square or a rectangular cross-section with an aspect ratio of 0.5 to 2, however these values should be considered as exemplary only. In other examples, the tube 522 may only have one channel 526.

Figure 8:
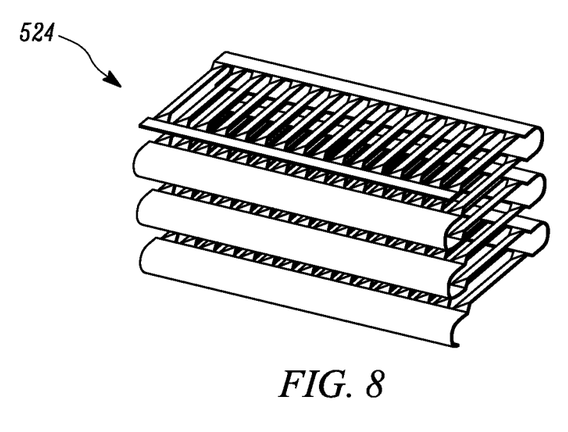
FIG. 8 is a perspective view of a fin, according to an embodiment of the present disclosure.
Figure 9:
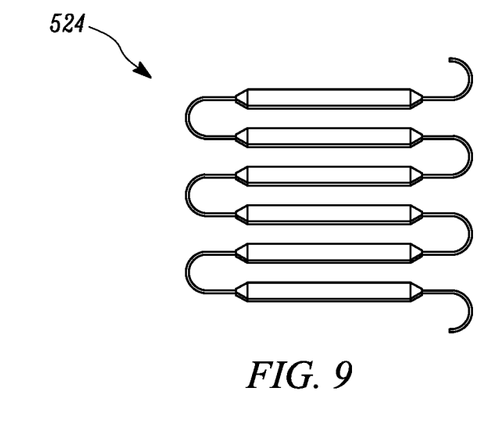
FIG. 9 is a side view of the fin, according to an embodiment of the present disclosure.
Figure 10:
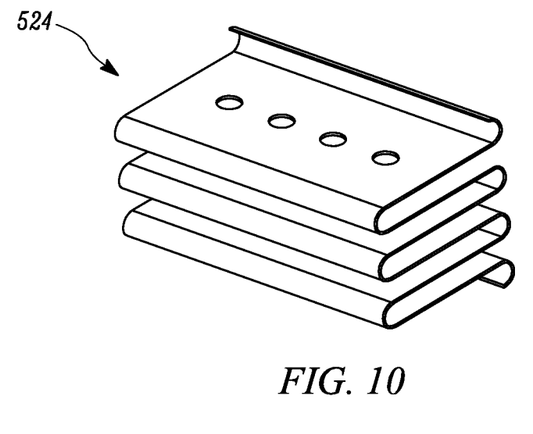
FIG. 10 is a perspective view of a fin, according to another embodiment of the present disclosure.
Figure 11:
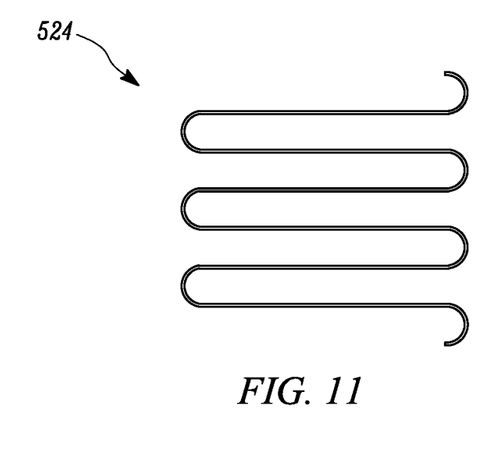
FIG. 11 is a side view of the fin, according to another embodiment of the present disclosure.

FIGS. 8-11 illustrate examples of fins 524 for the heat exchanger 226 of the present disclosure. The fins 524 may be louvered fins or non-louvered fins with perforated holes. FIGS. 8-9 illustrate, respectively, a perspective view and a planar view of the fins 524 with louvered configuration. FIGS. 10-11 illustrate, respectively, a perspective view and a planar view of the fins 524 with non-louvered configuration and perforated holes. In general, both the types of fins 524 divide the PCM into thin layers, which significantly improves heat transfer for the PCM in the heat exchanger 226. Further, the present design of the heat exchanger 226 keeps the coolant and the PCM isolated from each other, only allowing for heat transfer and preventing cross contamination of the fluids.

Figure 12:
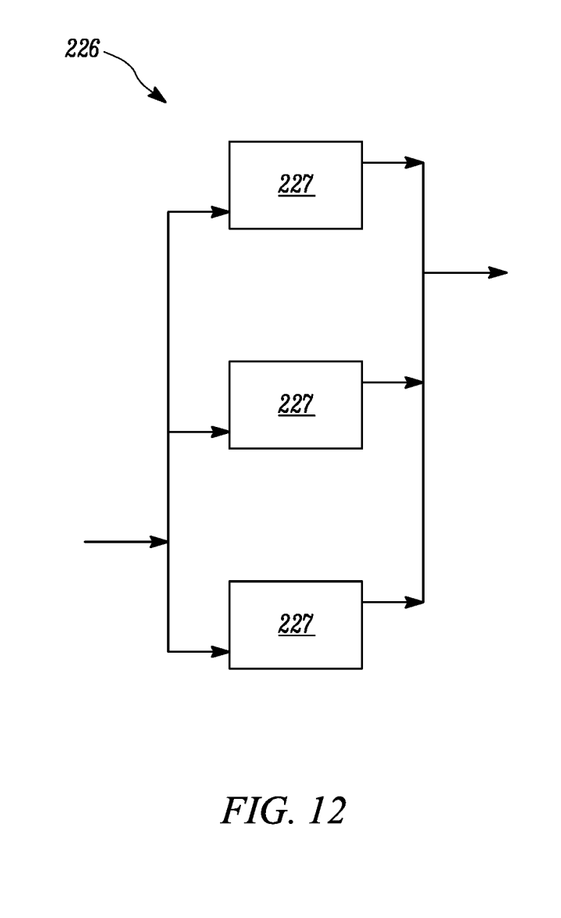
FIG. 12 is a schematic view of the heat exchanger, according to an embodiment of the present disclosure.
Figure 13:
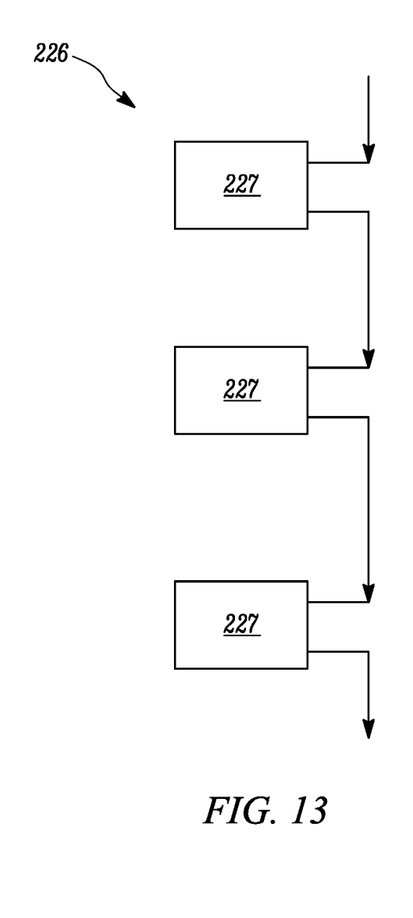
FIG. 13 is a schematic view of the heat exchanger, according to another embodiment of the present disclosure.

In some examples, the heat exchanger 226 may be of modular construction which may be utilized to increase or decrease the overall energy storage capacity of the heat exchanger 226 depending upon the application. FIGS. 12-13 illustrate schematics of two possible configurations for such modular heat exchanger 226. In FIG. 12, the heat exchanger 226 is shown to include various heat exchanger modules 227 disposed in a parallel arrangement for the flow of coolant. In FIG. 13, the heat exchanger 226 is shown to include various modules 227 disposed in a series arrangement for the flow of coolant. It may be understood that these modules 227 may in itself be a standalone PCM heat exchanger, and which could be combined together in different manner to change the energy storage capacity and other characteristics of the heat exchanger 226. As may be contemplated, the modularity of the heat exchanger 226 may also reduce the development and/or manufacturing costs, since only one standard module can be used for different applications.

Referring back to FIG. 3, in one example, the secondary circuit 204 may also include a first bypass line 232 connecting downstream and upstream of the coolant-to-air heat exchanger 230, e.g., between a first bypass junction 234 and a second bypass junction 236. The secondary circuit 204 may also include a first valve 238 disposed on the first bypass line 232. The first valve 238 may be configured to control the flow of coolant through the first bypass line 232, and thereby the coolant-to-air heat exchanger 230. The secondary circuit 204 may also include a second bypass line 240 connecting downstream and upstream of the chiller 224, e.g., between a third bypass junction 242 and a fourth bypass junction 244. The secondary circuit 204 may include a second valve 246 disposed on the second bypass line 240. The second valve 246 may be configured to control the flow of coolant through the second bypass line 240, and thereby the chiller 224.

In one example, the secondary circuit 204 may further include a third valve 248 disposed upstream of the coolant-to-air heat exchanger 230. The third valve 248 works in conjunction with the first valve 238 to closely regulate the flow of coolant through the coolant-to-air heat exchanger 230. As may be understood, the third valve 248, in conjunction with the first valve 238, may be configured to control the amount of coolant flowing through the first bypass line 232 and the coolant-to-air heat exchanger 230. Further, the secondary circuit 204 may include a fourth valve 250 disposed upstream of the chiller 224. The fourth valve 250 works in conjunction with the second valve 246 to further regulate the flow of coolant through the chiller 224.

In one example, the first valve 238, the second valve 246, the third valve 248 and the fourth valve 250 may be solenoid controlled one-way valves. The valves 238, 246, 248, 250 are configured to function in conjunction with the pump 228 to circulate the coolant either from the chiller 224 to the heat exchanger 226 (during the charge mode of the PCM), and from the heat exchanger 226 to the coolant-to-air heat exchanger 230 (during the discharge mode of the PCM), as explained earlier.

Further, as seen in FIG. 3, in one example, the primary circuit 202 may also include a second throttling device 252 disposed between the first manifold 214 and the chiller 224. The second throttling device 252 may be configured to set a pre-determined evaporation temperature required for the chiller 224. In some examples, the throttling devices 212, 252 may be thermal expansion valves. As a thermal expansion valve, the first throttling device 212 may automatically regulate the refrigerant flow through the main loop 213 and the evaporator 210, based on its thermal load. Similarly, the second throttling device 252 may automatically regulate the refrigerant flow through the chiller 224, based on thermal load of the chiller 224. In addition, the two throttling devices 212, 252 may be configured to set two different evaporator temperatures for the evaporator 210 and the chiller 224, respectively. As an example, the evaporation temperature of the chiller 224 is typically lower than that for the evaporator 210.

The primary circuit 202 may also include a shut-off valve 254 to allow or stop the flow of refrigerant to the chiller 224, and thus control the exchange of heat with the coolant of the secondary circuit 204. The primary circuit 202 may, optionally, include a check valve 255 to prevent backflow of the refrigerant from the second manifold 216 to the chiller 224. Further, the shut-off valves 222, 254 may be utilized to regulate the refrigerant flow to the evaporator 210 and the chiller 224, respectively. The evaporator pressure regulating valve 220, in the main loop 213, may be utilized to maintain a higher evaporation pressure and temperature for the evaporator 210 compared to the chiller 224. The shut-off valve 254 may also prevent possible backflow of the refrigerant from the second manifold 216 to the chiller 224.

In an embodiment, the primary circuit 202 and the secondary circuit 204 may be in heat exchange relationship with each other. In particular, the refrigerant from the main loop 213 may be circulated to the chiller 224 to exchange heat with the coolant. As illustrated in FIG. 3, in the air-conditioning system 200 of the present disclosure, the chiller 224 and the evaporator 210 is disposed in parallel relationship with respect to each other. That is, the refrigerant flow coming from the compressor 206 is split into the chiller 224 and the evaporator 210 at the first manifold 214. Further, the refrigerant flow from the chiller 224 and the evaporator 210 merges in the second manifold 216 and the refrigerant circulates back to the compressor 206. The purpose of the chiller 224 is to generate the cold coolant for charging the heat exchanger 226 in the secondary circuit 204 for energy storage. As discussed, the chiller 224 may be configured to exchange heat between the coolant and the refrigerant. For this purpose, the chiller 224 allows the flow of refrigerant from the primary circuit 202 and the flow of coolant from the secondary circuit 204, and facilitates transfer of heat between the refrigerant and the coolant by means of convection phenomenon. Typically, the cold refrigerant from the primary circuit 202 cools down the coolant in the secondary circuit 204. Further, the pump 228 drives the cooled coolant out from the chiller 224 and circulates the flow of coolant in the secondary circuit 204.

In the secondary circuit 204, the coolant from the chiller 224 may be directed to flow into the heat exchanger 226 to charge the phase change material, by operating one or more valves in the secondary circuit 204. Specifically, the phase change material may be disposed in heat exchange relationship with the coolant, received from the chiller 224. The heat exchanger 226 may receive the coolant via the inlet header 508. The received coolant flows into the tubes 522 of the heat exchanger 226 for exchange of heat with the phase change material. During a charge mode when the engine 104 is 'ON', the valves 246 and 248 are closed, and the valves 238 and 250 are open, and the pump 228 circulate the coolant through the chiller 224 and the heat exchanger 226, where the coolant exchanges heat with the phase change material, or more typically absorbs heat from the phase change material to change the phase change material from a liquid phase to a solid phase, and in the process store thermal energy in the phase change material in the form of sensible and latent heat of fusion. During a discharge mode when the engine 104 is 'OFF', the valves 238 and 250 are closed, and the valves 246 and 248 are open, and the pump 228 circulates the coolant in the secondary circuit 204 through the heat exchanger 226 and the coolant-to-air heat exchanger 230. In the process, the stored thermal energy in the heat exchanger 226 is extracted through melting of the frozen PCM, which cools the coolant. Then, the cooled coolant from the heat exchanger 226 flows to the coolant-to-air heat exchanger 230, where the coolant exchanges heat with air in the cabin 106 and provides the air-conditioning effect.

Figure 4:
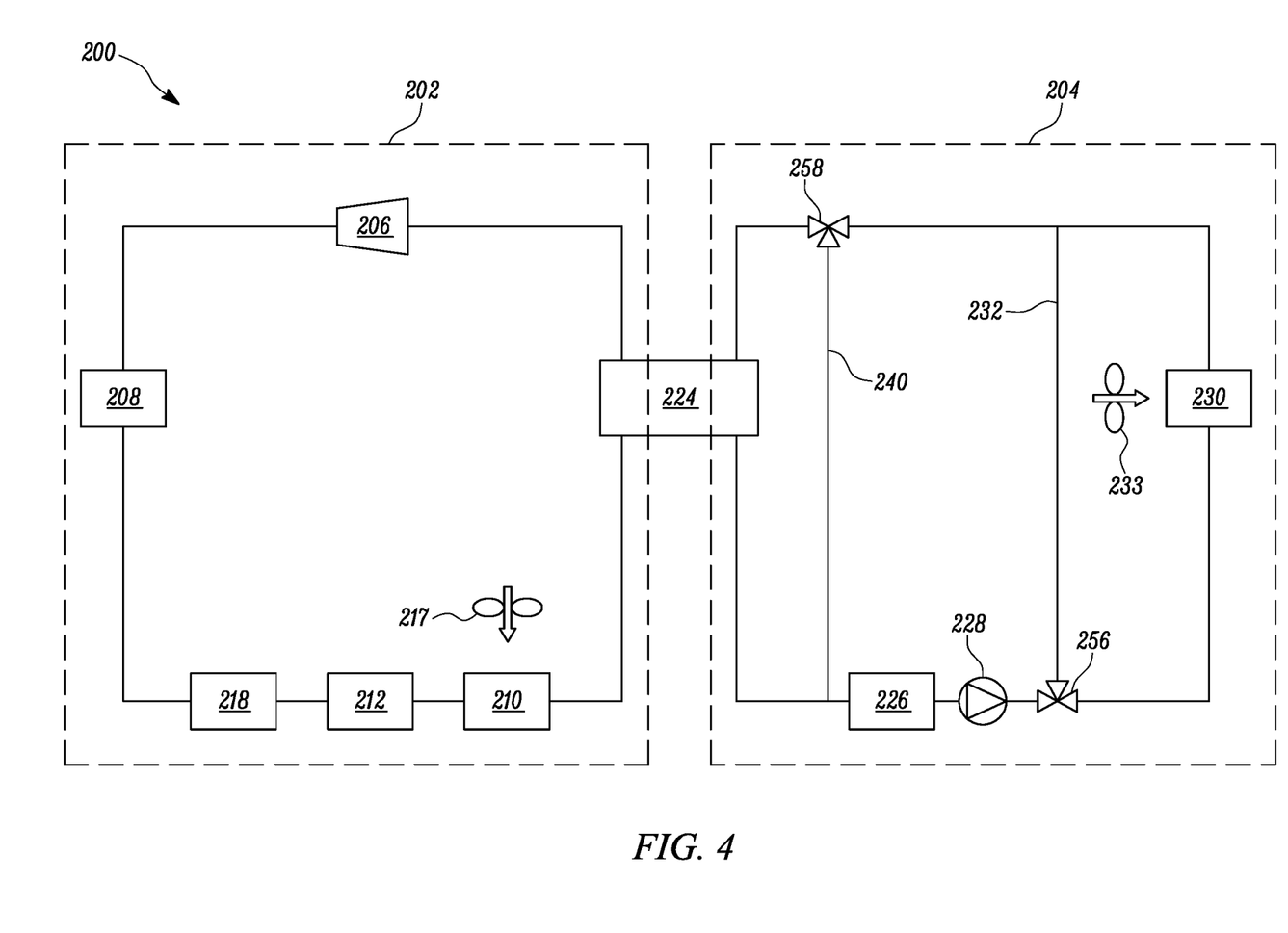
FIG. 4 is a schematic illustration of the air-conditioning system, according to another embodiment of the present disclosure.

FIG. 4 illustrates an alternate embodiment for the air-conditioning system 200. As illustrated, the chiller 224 may be disposed in series with the evaporator 210, in the primary circuit 202. In this configuration, the refrigerant may flow into the chiller 224 after flowing through the evaporator 210, in the primary circuit 202. The relatively cool refrigerant after exchanging some heat in the evaporator 210 flows through the chiller 224 and further exchanges heat with the coolant from the secondary circuit 204. The coolant, from the chiller 224, may be circulated in the secondary circuit 204 to freeze or charge the PCM in the heat exchanger 226. It may be understood that the various valves and their arrangement, as shown in FIG. 3, may be replaced with three-way valves or some other valve arrangement to achieve the desired function without departing from the scope of the present disclosure. For example, FIG. 4 also shows another configuration for the secondary circuit 204 with an alternate valve arrangement. In the configuration of FIG. 4, the secondary circuit 204 may include a first three-way valve 256 configured to switch the flow of coolant either to the coolant-to-air heat exchanger 230 or to the chiller 224. It may be understood that the first three-way valve 256 simplifies the secondary circuit 204 by replacing the valves 238, 248 in the secondary circuit 204 of FIG. 3. Further, the secondary circuit 204 may include a second three-way valve 258 configured to switch the flow of coolant either to the chiller 224 or to the heat exchanger 226, and thereby replacing the valves 246, 250 in the secondary circuit 204 of FIG. 3. It may be contemplated by a person skilled in the art that the configuration of the secondary circuit 204 as shown in FIG. 4 may also be implemented in the air-conditioning system 200 of FIG. 3 and vice-versa.

Referring back to FIG. 2, the air-conditioning system 200 may also include a controller 260, in accordance with an embodiment of the present disclosure. Generally, the controller 260 may be configured to operate the various components of the air-conditioning system 200 to control the flow of refrigerant and coolant inside the various circuits, in response to change in operating conditions of the machine 100. It may be understood that the controller 260 may be a logic unit using any one or more of a processor, a microprocessor, a microcontroller, or any other suitable means. The controller 260 may be based on integrated circuitry, discrete components, or a combination of the two. It will be appreciated that other peripheral circuitry such as buffers, latches, switches and so on may be implemented within the controller 260 or separately as desired. Various circuits may be associated with the controller 260, such as power supply circuitry, signal conditioning circuitry, solenoid driver circuitry, and other types of circuitry.

In an embodiment, the controller 260 may be configured to determine whether the machine 100 is in an 'operation state', an 'idle state' or an 'idle off state'. In one example, the machine 100 is said to be in the 'operation state' when the machine 100 is being propelled by the engine 104 and the engine 104 is operating above a minimum engine speed or load; while the machine 100 is said to be in the 'idle state' when the machine 100 is standing stationary and the engine 104 is operating at the minimum engine speed or load; and conversely the machine 100 is said to be in the 'idle off state' when the engine 104 is shut off. For this purpose, the air-conditioning system 200 may include one or more sensors 262, like thermocouples, flow and pressure sensors, fuel and speed sensors, accelerometers, etc., in communication with the engine 104 and the controller 260. The use and functioning of controllers in conjunction with the sensors to determine an operating state of the machine is well known and thus has not been described in detail for brevity of the disclosure. In one example, if the controller 260 detects that the machine 100 is in 'idle state' for an extended period of time, the controller 260 may warn the operator and shut down the engine 104 after a pre-determined time to place the machine 100 in 'idle off state'. This may be done, particularly, in case if the controller 260 determines that the operator has decided to keep the engine 104 running solely for the purpose of maintaining the temperature inside the cabin 106 to a desired level.

During the 'idle off state', the controller 260 may be configured to determine a temperature inside the cabin 106. For this purpose, the air-conditioning system 200 may include a temperature sensor 264 disposed inside the cabin 106 and in communication with the controller 260. If it is determined that the temperature inside the cabin 106 is out of a certain pre-determined range of operator's comfort, than the controller 260 may activate the secondary circuit 204 to bring the temperature inside the cabin 106 within the pre-determined range.

Figure 2:
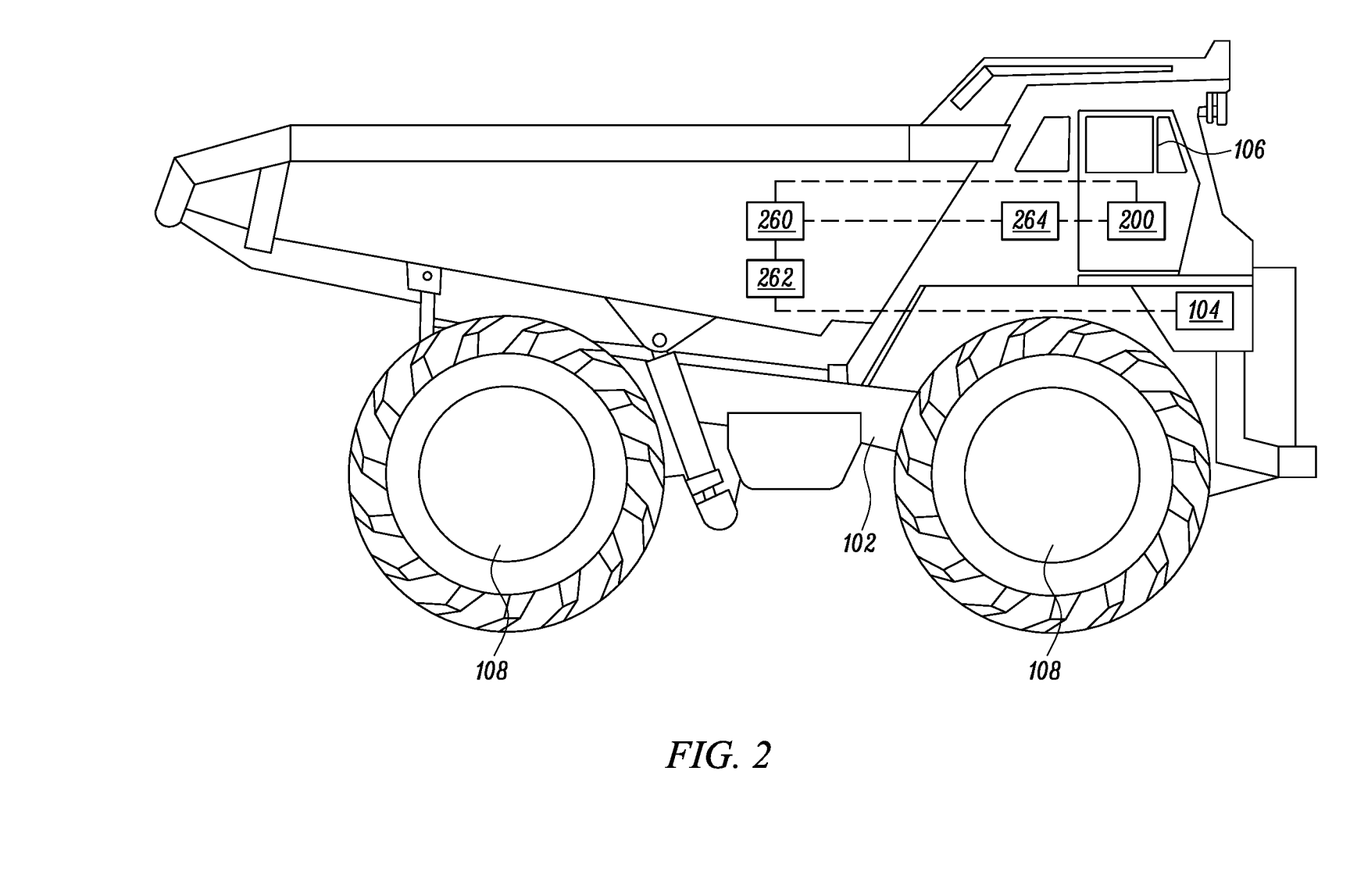
FIG. 2 is a diagrammatic illustration of an air-conditioning system in conjunction with the exemplary machine, according to an embodiment of the present disclosure.

As schematically illustrated in FIG. 2, the controller 260 may be disposed in signal communication with the air-conditioning system 200. In particular, the controller 260 may be in signal communication with all the operating components of the air-conditioning system 200, like the compressor 206, the pump 228 and the valves 220, 222, 238, 246, 248, 250, 254. This way, the controller 260 may operate these various components and therefore selectively activate or deactivate the primary circuit 202 and the secondary circuit 204 based on the requirement of the air-conditioning system 200.

In the air-conditioning system 200, the controller 260 is configured to selectively activate the primary circuit 202 during the 'operation state' of the machine 100. The controller 260 may achieve that by opening the shut-off valve 222. In 'operation state' of the machine 100, the engine 104 may drive the compressor 206 to generate the flow of refrigerant in the main loop 213 and thus regulate the temperature inside the cabin 106 of the machine 100, as described above. Further, during the 'operation state' of the machine 100, the controller 260 may also keep the shut-off valve 254 open to allow the refrigerant to flow to the chiller 224, via the first manifold 214. In one example, the controller 260 diverts the refrigerant flow to the chiller 224 only once the temperature inside the cabin 106 reaches a desired temperature as per the comfort setting based off operator input. The refrigerant in the chiller 224 exchanges heat with the coolant. Thereafter, the refrigerant flows back to the main loop 213, via the second manifold 216. Further in the 'operation state' of the machine 100, the controller 260 may open the first valve 238 to allow the coolant to flow through the first bypass line 232, and close the third valve 248 to stop the flow of coolant through the coolant-to-air heat exchanger 230. This way the coolant may flow through the heat exchanger 226 and charge the phase change material therein.

In an embodiment, the controller 260 is configured to selectively activate the secondary circuit 204 during the 'idle off state' of the machine 100. In the 'idle off state' of the machine 100, the engine 104 is shut off and therefore the primary circuit 202 may be deactivated as the compressor 206 may not be driven. Further in the 'idle off state' of the machine 100, the controller 260 may signal to power ON the pump 228 to start the flow of coolant in the secondary circuit 204. Also, the controller 260 may optionally close the shut-off valve 222 and the shut-off valve 254 to stop the flow of refrigerant in the primary circuit 202. Further, the controller 260 may open the second valve 246 and the third valve 248, and close the first valve 238 and the fourth valve 250, to allow the coolant to circulate through the heat exchanger 226 and then to the coolant-to-air heat exchanger 230. Additionally, in the 'operation state', the controller 260 may stop the flow of the coolant in the secondary circuit 204 when the PCM is fully charged. In the 'idle off state' of the machine 100, the heat exchanger 226 may transfer heat with the coolant by using the thermal energy stored in the charged phase change material, and the coolant-to-air heat exchanger 230 may regulate the temperature inside the cabin 106 by exchanging heat between the coolant and air inside the cabin 106.

INDUSTRIAL APPLICABILITY

The air-conditioning system 200 of the present disclosure provides the primary circuit 202 and the secondary circuit 204 which are configured to regulate the temperature inside the cabin 106. The primary circuit 202 derives power from the engine 104 for its operation, and therefore may be utilized while the machine 100 is in the 'operation state'. The primary circuit 202 while regulating the temperature inside the cabin 106, also simultaneously charges the phase change material in the heat exchanger 226 of the secondary circuit 204 to store thermal energy therein. During the 'idle off state' of the machine 100, this stored thermal energy is utilized by the secondary circuit 204 to regulate the temperature inside the cabin 106. Thus, the secondary circuit 204 may not require any direct power from the engine 104, and therefore may be utilized while the machine 100 is in the 'idle off state'. The controller 260 may selectively activate or deactivate the primary circuit 202 and the secondary circuit 204 based on the operating condition of the machine 100.

In the heat exchanger 226 of the present disclosure, as illustrated in FIG. 7, the use of multiple rows of the tubes 522 allows for increased depth and reduces the footprint area of the heat exchanger 226. Further, the multi row design improves thermal insulation and allows for increase in potential for energy storage by the PCM of the heat exchanger 226. Also, the multiple row design allows for easy scalability of the heat exchanger 226 as per the demands of the air-conditioning system 200. Further, as illustrated in FIGS. 8-11, the fins 524, either with louvered configuration or non-louvered configuration with perforated holes, allows for relatively free flow of the PCM across its walls, which can help with filling of the PCM liquid into the heat exchanger 226, via the PCM filling port 518, and may also help to reduce possible stresses during charging and discharging of the PCM, as it freezes and melts. The multiple channels 526, in the tube 522, provides better coolant side heat transfer coefficient in the heat exchanger 226, which can help reduce charge or discharge time for the PCM. The multiple channels 526 also improves flow distribution through the heat exchanger 226 and provide relatively high coolant side heat transfer performance even at a low flow rate of the coolant. Also, the present tubes 522 with multiple channels 526 are structurally stronger than conventional flat tubes with single flow path, due to one or more support walls between the channels 526, which in turn may help to make the tubes 522 wider, and increase the depth of the heat exchanger 226. In one example, the heat exchanger 226 with four rows of the tubes 522 is estimated to have an energy storage potential of about 2700 kJ, which may provide the air-conditioning effect for the machine 100 for about 15 to 30 minutes after the engine 104 shuts off. Further such heat exchanger 226 achieves a heat transfer rate in the range of 2.8 to 6.1 kW for charging and 6 to 10 kW for discharging of the PCM.

Figure 14:
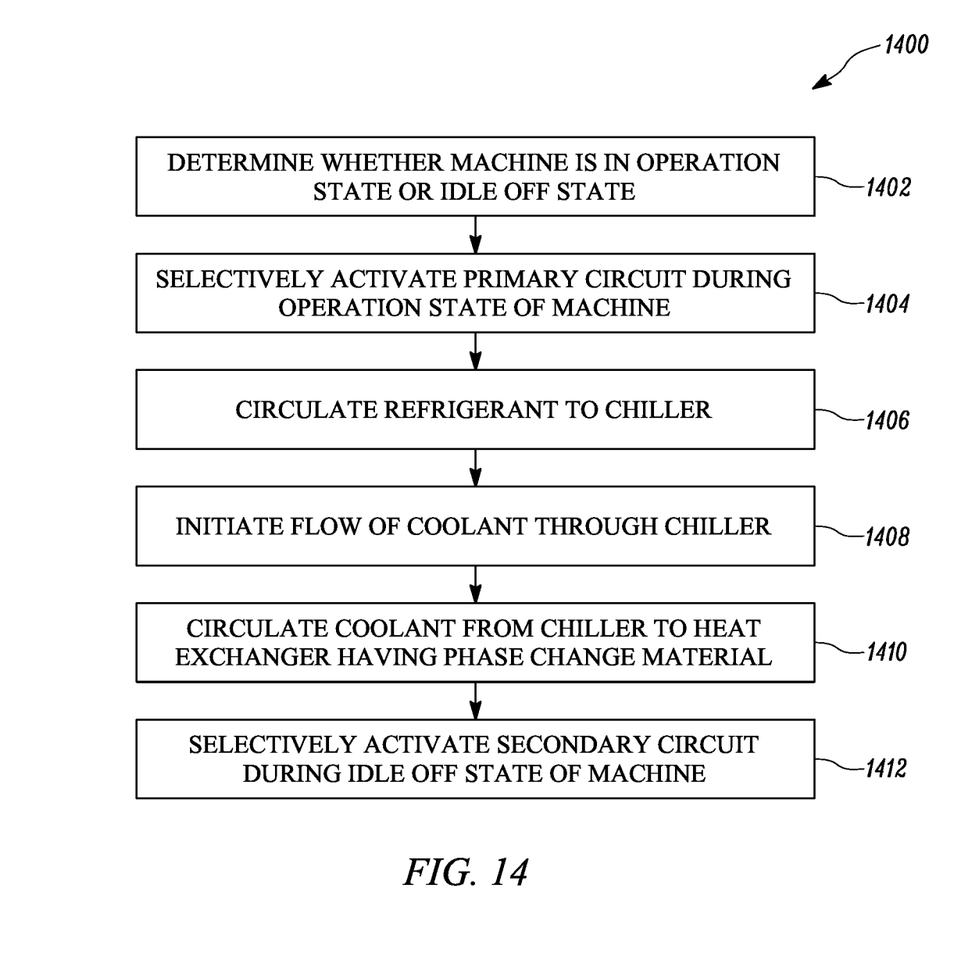
FIG. 14 is a flow chart depicting a method of operating the air-conditioning system, according to an embodiment of the present disclosure.

FIG. 14 illustrates a method 1400 of operating the air-conditioning system 200, in accordance with an embodiment of the present disclosure. In block 1402, the method 1400 includes determining whether the machine 100 is in the 'operation state' or the 'idle off state'. In block 1404, the method 1400 includes selectively activating the primary circuit 202 during the 'operation state' of the machine 100. The method 1400 includes initiating the flow of refrigerant in the primary circuit 202 to exchange heat between air in the cabin 106 and the refrigerant via the evaporator 210. In block 1406, the method 1400 includes circulating the refrigerant to the chiller 224. In block 1408, the method 1400 includes initiating the flow of coolant through the chiller 224 to exchange heat between the coolant and the refrigerant. In block 1410, the method 1400 includes circulating the coolant from the chiller 224 to the heat exchanger 226 to facilitate exchange of heat between the coolant and the phase change material, and store energy in the phase change material. In block 1412, the method 1400 includes selectively activating the secondary circuit 204 during the 'idle off state' of the machine 100. The method 1400 includes circulating the coolant from the heat exchanger 226 to the coolant-to-air heat exchanger 230 to exchange heat between air in the cabin 106 and the refrigerant via the coolant-to-air heat exchanger 230.

The secondary circuit 204 allows for regulating the temperature inside the cabin 106 without directly drawing any direct power from the engine 104. This reduces the need to keep the engine 104 running while the machine 100 is in the 'idle state' just to provide air-conditioning effect inside the cabin 106. This in turn, may help to save large amount of fuel, increasing the overall efficiency of the machine 100 and reducing pollution. Also, in one example, the secondary circuit 204 may supplement the primary circuit 202 in case of peak loads, i.e., when the cooling effect of the primary circuit 202 may not be sufficient to regulate the temperature to a desired level inside the cabin 106. Further, in one example, the operator of machine 100 may manually activate the secondary circuit 204 at any time during machine operation via an onboard interface (not shown) to conserve remaining fuel, which otherwise may be used for air-conditioning purposes. Also, in one example, the controller 260 may be programmed to activate or deactivate the primary circuit 202 and/or the secondary circuit 204 based on the temperature of the air inside the cabin 106.

In the air-conditioning system 200, as illustrated in FIG. 3, the chiller 224 is placed in parallel relationship to the evaporator 210. Therefore, the flow of refrigerant into the chiller 224 is independent to the flow of refrigerant into the evaporator 210. The use of the second throttling device 252 allows for more precise control of flow and temperature of the refrigerant into the chiller 224. This in turn would help to regulate the heat exchange between the refrigerant and the coolant in the chiller 224, and thus the temperature of the coolant inside the secondary circuit 204. Further, the flow of coolant may be controlled by the pump 228 in the secondary circuit 204. These factors may vary based on the need to charge the phase change material inside the heat exchanger 226. For example, setting a lower evaporation temperature for the refrigerant with the second throttling device 252 reduces the coolant temperature and reduces the time required to charge the phase change material in the heat exchanger 226.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An air-conditioning system comprising:
   a primary circuit having a refrigerant flowing therein, the primary circuit comprising:
      a compressor configured to compress and circulate the refrigerant;
      a condenser configured to exchange heat between the refrigerant and air in an outside environment;
      an evaporator configured to exchange heat between the refrigerant and air in an operator cabin; and
      a chiller configured to exchange heat between the refrigerant and a coolant; and
   a secondary circuit having the coolant flowing therein, the secondary circuit comprising:
      a phase change material heat exchanger, having a phase change material, in fluid communication with the chiller to receive the coolant, the phase change material heat exchanger configured to exchange heat between the phase change material and the coolant and thereby store energy in the phase change material; and
      a coolant-to-air heat exchanger in fluid communication with the phase change material heat exchanger to receive the coolant, the coolant-to-air heat exchanger configured to exchange heat between the coolant and air in the operator cabin.

2. The air-conditioning system of claim 1, wherein the chiller is disposed in parallel to the evaporator, to receive the refrigerant from upstream of the evaporator.

3. The air-conditioning system of claim 2, wherein the primary circuit further comprises a first throttling device disposed between the condenser and the evaporator, the first throttling device configured to control a flowrate and temperature of the refrigerant being introduced into the evaporator.

4. The air-conditioning system of claim 3, wherein the primary circuit further comprises a second throttling device disposed between the condenser and the chiller, the second throttling device configured to control a flowrate and temperature of the refrigerant being introduced into the chiller.

5. The air-conditioning system of claim 1, wherein the chiller is disposed in series with the evaporator, to receive the refrigerant from the evaporator.

6. The air-conditioning system of claim 1, wherein the secondary circuit further comprises a pump configured to control a flowrate of the coolant from the phase change material heat exchanger to the chiller, and from the phase change material heat exchanger to the coolant-to-air heat exchanger.

7. The air-conditioning system of claim 1, wherein the secondary circuit further comprises a first bypass line connecting downstream and upstream of the coolant-to-air heat exchanger, the first bypass line having a first valve configured to regulate the flow of the coolant through the coolant-to-air heat exchanger.

8. The air-conditioning system of claim 1, wherein the secondary circuit further comprises a second bypass line connecting downstream and upstream of the chiller, the second bypass line having a second valve configured to regulate the flow of the coolant through the chiller.

9. The air-conditioning system of claim 1, wherein the phase change material is paraffin wax.

10. An air-conditioning system comprising: a primary circuit having a refrigerant flowing therein, the primary circuit including a condenser; an evaporator configured to exchange heat between the refrigerant and air in an operator cabin; a secondary circuit having a coolant flowing therein; wherein each of the primary circuit and the secondary circuit are in fluid communication with a chiller configured to exchange heat between the refrigerant and the coolant; wherein the secondary circuit comprises: a phase change material heat exchanger in fluid communication with the chiller to receive the coolant, the phase change material heat exchanger containing a phase change material configured to exchange heat with the coolant; and a coolant-to-air heat exchanger in fluid communication with the phase change material heat exchanger to receive the coolant from the phase change material heat exchanger, the coolant-to-air heat exchanger configured to exchange heat between the coolant and air in the operator cabin; and wherein the air-conditioning system is configured to operate in a first mode and a second mode, the first mode including circulating the coolant in the secondary circuit through the chiller and the phase change material heat exchanger, and the second mode including circulating the coolant in the secondary circuit from the phase change material heat exchanger through the coolant-to-air heat exchanger.

11. The air-conditioning system of claim 10, wherein in the first mode, the coolant does not flow through the coolant-to-air heat exchanger.

12. The air-conditioning system of claim 11, wherein in the second mode, the coolant does not flow through the chiller.

13. The air-conditioning system of claim 10, wherein in the first mode, energy is stored in the phase change material, and in the second mode, energy is extracted from the phase change material.

14. The air-conditioning system of claim 10, wherein the air-conditioning system is configured to operate in a third mode wherein the refrigerant is circulated in the primary circuit between the evaporator and the condenser.

15. The air-conditioning system of claim 10, wherein the phase change material heat exchanger includes a plurality of fins to exchange heat between the phase change material and the coolant.

16. An air-conditioning system comprising: a primary circuit having a refrigerant flowing therein, the primary circuit comprising: a condenser configured to exchange heat between the refrigerant and air in an outside environment; an evaporator configured to exchange heat between the refrigerant and air in an operator cabin; a chiller in fluid communication with the primary circuit and a secondary circuit having a coolant flowing therein, the chiller configured to exchange heat between the refrigerant and the coolant; wherein the secondary circuit comprises: a phase change material heat exchanger, having a phase change material, in fluid communication with the chiller to receive the coolant, the phase change material heat exchanger configured to exchange heat between the phase change material and the coolant; a coolant-to-air heat exchanger in fluid communication with the phase change material heat exchanger to receive the coolant from the phase change material heat exchanger, the coolant-to-air heat exchanger configured to exchange heat between the coolant and air in the operator cabin; a first valve disposed upstream of the coolant-to-air heat exchanger, the first valve configured to regulate the flow of the coolant through the coolant-to-air heat exchanger; and a second valve disposed upstream of the chiller, the second valve configured to regulate the flow of the coolant through the chiller.

17. The air-conditioning system of claim 16, wherein the first valve and the second valve are three-way valves, the first valve configured to divert the flow of the coolant either to the chiller or to the coolant-to-air heat exchanger, and the second valve configured to divert the flow of the coolant either to the chiller or to the phase change material heat exchanger.

18. The air-conditioning system of claim 17, wherein the air-conditioning system is configured to operate in a first mode and a second mode, the first mode including circulating the coolant in the secondary circuit through the chiller and the phase change material heat exchanger, and the second mode including circulating the coolant in the secondary circuit from the phase change material heat exchanger through the coolant-to-air heat exchanger.

19. The air-conditioning system of claim 18, wherein in the first mode the first valve diverts the coolant to the chiller and the second valve diverts the coolant to the chiller.

20. The air-conditioning system of claim 19, wherein in the second mode the first valve diverts the coolant to the coolant-to-air heat exchanger and the second valve diverts the coolant to the phase change material heat exchanger.

\* \* \* \* \*